(No Model.) 6 Sheets—Sheet 1.

B. C. POLE.

DUPLEX LOCOMOTIVE.

No. 335,479. Patented Feb. 2, 1886.

WITNESSES:
Fred G. Dieterich
J. G. Hinkel

INVENTOR.
Benjamin C. Pole

(No Model.) 6 Sheets—Sheet 3.

B. C. POLE.
DUPLEX LOCOMOTIVE.

No. 335,479. Patented Feb. 2, 1886.

Witnesses
Samuel E. Cavin
Jas Sadler

Inventor
Benjamin C. Pole (No Model.) 6 Sheets—Sheet 6.

B. C. POLE.
DUPLEX LOCOMOTIVE.

No. 335,479. Patented Feb. 2, 1886.

Witnesses.
Samuel E. Cavin
James Sadler

Inventor
Benjamin C. Pole

N. PETERS, Photo-Lithographer, Washington, D. C.

UNITED STATES PATENT OFFICE.

BENJAMIN C. POLE, OF PHILADELPHIA, PENNSYLVANIA.

DUPLEX LOCOMOTIVE.

SPECIFICATION forming part of Letters Patent No. 335,479, dated February 2, 1886.

Application filed April 25, 1882. Serial No. 59,436. (No model.)

*To all whom it may concern:*

Be it known that I, BENJAMIN C. POLE, a citizen of the United States, residing at Philadelphia, in the county of Philadelphia and State of Pennsylvania, have invented certain new and useful Improvements in the Duplex Locomotive (both Freight and Passenger) Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of locomotives or motors which is designed to pull tramway or street cars, the same being designed as an improvement upon the construction shown and described in United States Letters Patent Nos. 89,361, 103,635, 116,610, and 117,307, dated April 27, 1869, May 31, 1870, July 4, 1871, and July 25, 1871, respectively; and it consists, essentially, in the details of construction and general arrangement of parts, all as will be hereinafter more fully described, and specifically designated in the claims.

It also consists in the application of a hydrocarbon-engine, a gas-engine compressing air and pumping water, or by pumps exhausting air and forming a vacuum, the air to be used for the purpose of operating a valve system, and the water used for the purpose of operating the pistons in the cylinders, which force along the foot actions for the traction of the locomotive, the elastic action of the air for lifting the feet, and the positive force of hydraulic pressure for forcing along the feet.

It also consists of a certain construction that will allow the continuous action of the hydrocarbon-engine to compress the air and force the water to a pressure to be afterward used by the foot-operating cylinders of the locomotive; also, in certain constructions of both the air and water reservoirs, whereby they will be kept filled from the action of the hydrocarbon-engine and overflow at a certain pressure capable of being regulated; also, in certain constructions by which the supply of hydrocarbon or gas to be supplied to the gas-engine is checked when the desired pressure is gained in the reservoirs; also, in a hydraulic safety-valve and overflow from the action of which is derived the checking action for the hydrocarbon-engine; also, in certain constructions for raising and planting the foot-traction mechanism at the will of the driver of the locomotive; also, in certain automatic construction for lifting or taking up the feet and allowing the locomotive to roll along, as down grade, without operating the feet, as, also, for planting the foot-traction mechanism, which is controlled by the action of the locomotive.

It further consists of certain constructions, whereby one foot on one side of the engine can be lifted up from the ground without interfering with the operation of the opposite foot in rising and falling, according to the general action of the duplex cylinders, two cylinders—one hydraulic and the other air—constituting the operative force of each foot, and each of said feet with their cylinders being independent of each other, so that they can rise and fall together, or one be up and the other down, one in action and the other checked in action; also, in a novel reverse action for the locomotive, and in a simplified construction for operating by a pneumatic system the hydraulic cylinders and valves of the locomotive.

It further consists in an improved construction for preventing injury to the hydrocarbon-engine from concussion incident to its use upon the locomotive, and in certain other constructions, whereby the inertia derived from the action of the foot mechanism of the locomotive shall be even and regular, and, when desired, alternate.

It consists, lastly, of an improved mechanism by which compressed gas is supplied to a regulator and from thence delivered to the gas-engine at a low pressure, exploded, and then exhausted into a covered or muffled box to destroy the sound, all as will be hereinafter more fully described.

In the accompanying drawings, Fig. 22 is a plan view of pneumatic valve. Fig. 23 is a cross-section through valve-plug. Fig. 24 is a side elevation of reverse mechanism of the locomotive, also driving levers for starting and stopping together with mechanism for raising and lowering the foot, also showing the stop-knobs for operating the pneumatic valves and couplers of the locomotive. Fig. 25 is a sectional elevation of Fig. 24 on the line $qq$. Fig. 26 is a sectional side elevation of the hydraulic supply-valve to the locomotive, and Fig. 26 is a section of Fig. 24 on the line $pp$.

Similar letters of reference occurring on the several figures indicate like parts.

The object of this invention is to provide a light rolling carriage, to roll upon a track, with either smooth or flanged wheels, upon which carriage there are provided several distinctly-different machines; one for using hydrocarbon gas as a power to pump water to a pressure, also to pump air to a pressure, and these pressures, when so derived, shall be used through another system of cylinders and valves, so that a traction-power shall be derived from a foot or pushing action or a pulling action upon the ground, saving weight of machine, which is unavoidable when wheels are used for the purposes of traction.

My invention also enables a locomotive to pull and climb in slippery weather, all of which is more fully hereinafter set forth.

In Figs. 1 to 6, 24, 25, and 26 is shown the frame-work A of the locomotive. This frame-work A is mounted upon pairs of wheels, B and B', and the front pair of wheels, B', are arranged to be steered by the apparatus $B^2$, so that should the locomotive leave the track these front wheels, B', can be set to an angle to steer the locomotive back upon the track.

Figure 1:
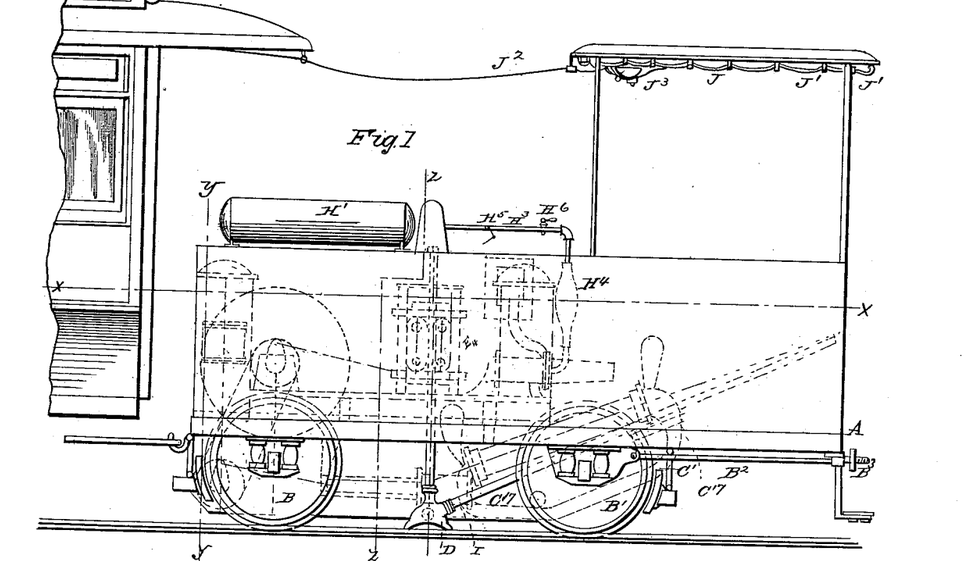
Figure 1 represents a side elevation of the duplex locomotive, showing its position with relation to a street-car, also showing in dotted lines the position of the duplex cylinders, the gas-engine, the water-pumps, the air-pumps, and the air and water reservoirs.
Figure 2:
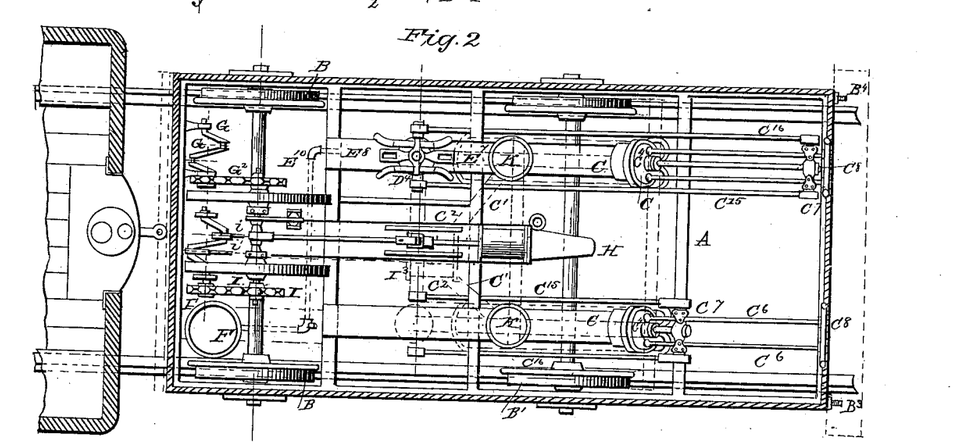
Fig. 2 represents a detail sectional plan of Fig. 1 on the line $x$ $x$, with one of the air or upright cylinders removed.
Figure 3:
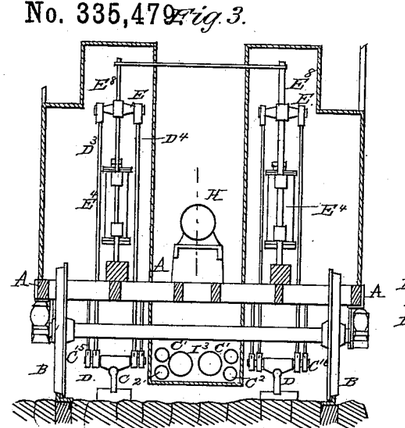
Fig. 3 a cross-section of Fig. 1, taken on the line $zz$.
Figure 4:
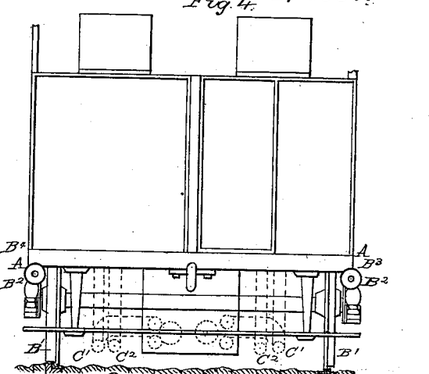
Fig. 4 represents a front elevation of the duplex locomotive.
Figure 5:
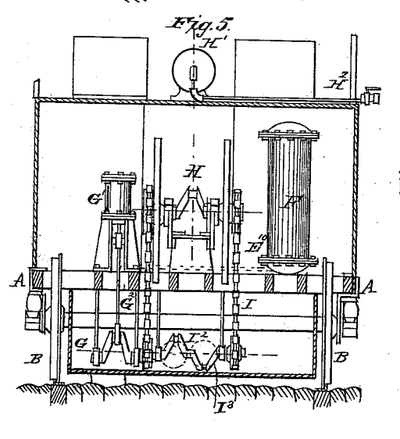
Fig. 5, a cross-sectional elevation, taken on the line $yy$ of Fig. 1.

In the construction shown in Figs. 1 and 4, there are the screw-threads $B^3$ and $B^4$ to draw forward one wheel and push back the other wheel of the pair B', thus bringing them to an angle for the purpose of steering the locomotive back on the track.

Figures 9, 10, 11, 12, 13:
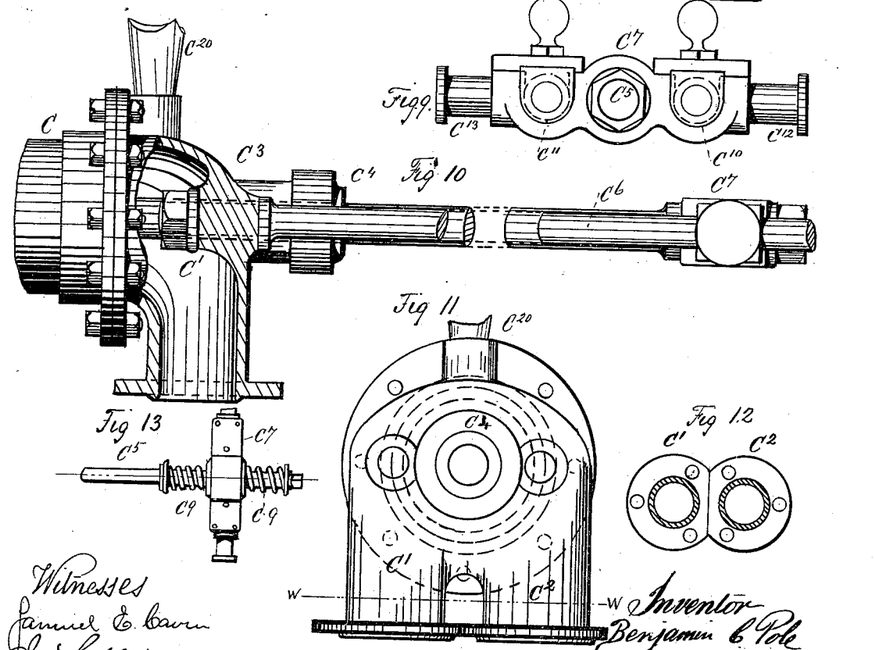
Fig. 9 represents the cross-head of the hydraulic cylinders.
Fig. 10 represents a side elevation in partial section of Fig. 8.
Fig. 11 represents a front elevation of the hydraulic cylinders.
Fig. 12, a cross-section of Fig. 11, in reduced size, on line $ww$.
Fig. 13 represents an equivalent cross-head to Fig. 9, showing a spring action in connection with the the piston-rod.
Figure 14:
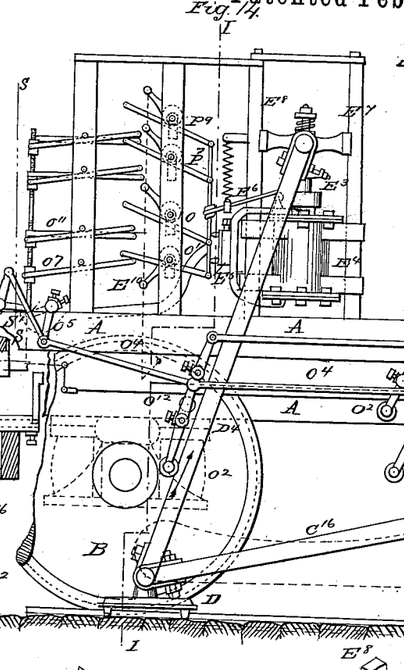
Fig. 14 is a sectional side elevation of the valve action and couplers belonging to the lifting-cylinders of the foot mechanism.
Figure 15:
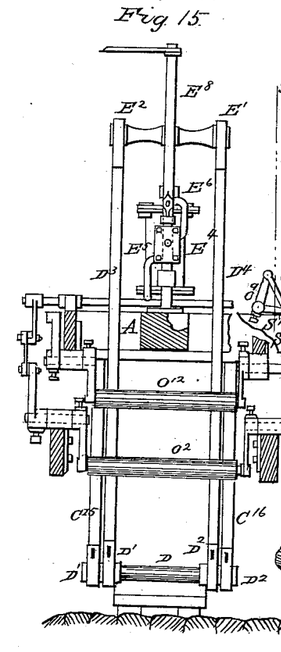
Fig. 15 is a part sectional view on the line I I of Fig. 14.

To the frame-work A are arranged two diagonal cylinders, C, at or near either side of the locomotive. These cylinders C are independent of each other, and are operated by water fed to them through the pipes C' and $C^2$. Both pressure-pipes for either of the two cylinders C are understood as C', and both pipes, $C^2$, for either of the two cylinders C, are understood as exhaust-pipes $C^2$. The caps or covers $C^3$ of the cylinder C are provided with stuffing-boxes $C^4$, for their respective piston-rods $C^5$, and have cast-iron bosses for the guide-rods $C^6$ to pass through, and to be bolted onto said caps $C^3$. The guide-rods $C^4$ project out and rest at $C^8$, and are made to guide and carry the cross-heads $C^7$, which are attached to the piston-rods $C^5$, either rigidly or with springs $C^9$, as shown in Fig. 13. The cross-head $C^7$ is provided with wearing brasses $C^{10}$ and $C^{11}$, also with two journals, $C^{12}$ and $C^{13}$, to engage with the straps $C^{14}$ of the two connecting-rods $C^{15}$ and $C^{16}$, belonging to each cross-head system of each cylinder C. These double connecting-rods $C^{15}$ and $C^{16}$ connect with a single foot, D, and each foot D has its double connecting-rod and connections with the cross-head for the cylinders.

The foot-action D is made of wood, rubber, or other suitable material, and is constructed in several equivalent forms, some of which are provided with journals D' and $D^2$ to connect with the before-stated connecting rods $C^{15}$ and $C^{16}$; also, with additional journals D' and $D^2$, connecting with $D^3$ and $D^4$, all of which connect with the cross-head E by journals and straps E' and $E^2$, said cross-head being arranged upon the piston-rod $E^3$ of the lifting air-cylinder $E^4$. This cylinder $E^4$ is operated by the valve $E^5$, which valve $E^5$ is governed by the valve-rod $E^6$. (Shown in dotted lines in Figs. 1, 3, 6, and 7.) The cylinder E is made so that the valve $E^5$ operates to turn on the air through rubber pipes $e$ and $e'$. In this construction the cylinder $E^4$ is made to rise up and slide upon the guides $E^7$ and $E^8$, and thereby cause its own weight to be thrown down upon the foot mechanism D, and it may be provided with additional weights $E^9$, to increase the positive amount of weight transmitted to the feed mechanism D.

Figure 6:
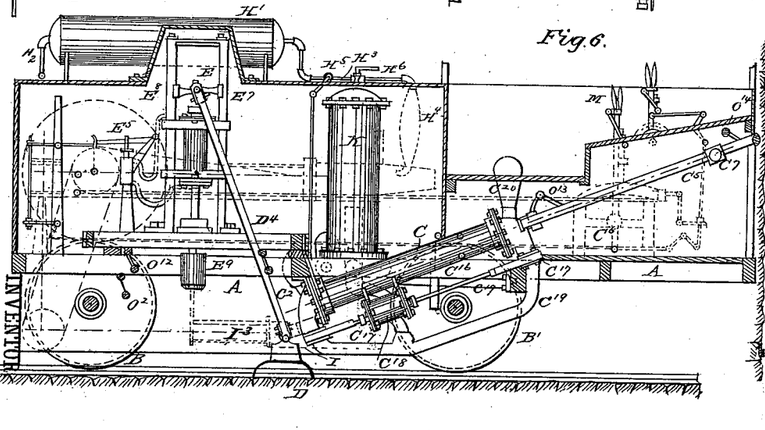
Fig. 6 represents a cross-sectional side elevation of locomotive, the traction-foot mechanism arranged with a weight.
Figure 7:
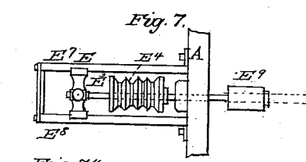
Figs. 7 and 7½ represent in elevation three equivalent cylinders for raising and lowering the foot mechanism.
Figure 8:
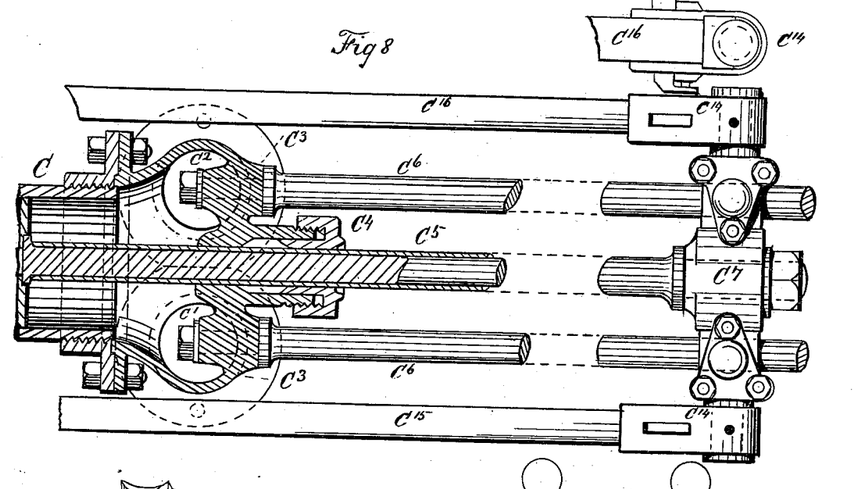
Fig. 8 represents a sectional plan of the piston end of the hydraulic cylinders.

In Figs. 7½, 14, 15, and 17 the cylinder $E^4$ is secured to the guides $E^7$ and $E^8$, and pressure of the compressed air is made to force and hold down the feed mechanism D. It is understood that the two feet D—one on each side—are independent of each other, although performing identically the same duties. The pipe $E^{10}$ connects the valve $E^5$ with the air-reservoir F, said reservoir being supplied with air-pressure through the action of the gas engine connections which operate the crank-axle G and air-pump G'. The gas-engine is herein shown as connected to the crank-axle G by an endless chain, $G^2$, or any suitable connection may be used. It may be stated, however, that any of those engines commonly used to develop power may be used in this locomotive in place of the gas-engine H, or one charging of the hydraulic reservoir K and air-reservoir F at the depot may be effected. The gas or hydrocarbon engine H is connected by a belt, I, to a pinion, I', on a crank-axle, $I^2$. This again connects with connecting-rod $i$ and $i'$ to the hydraulic pumps $I^3$, which are shown in Figs. 1, 2, 5, and 6 in dotted lines. This hydraulic pump $I^3$ repeatedly pumps and repumps the water into one or more reservoirs, K, through the pipe K', deriving its resupply from the exhaust-pipes $C^2$. The water forced into the reservoir K is made to acquire a certain pressure, and after the desired pressure is secured the dead-weight L' of the safety-valve L is lifted and the pressure relieved. This safety-valve L can be lifted by the engineer by the lever $L^2$, in which instance the water is merely allowed to return to the exhaust-pipe $C^2$, to be pumped and repumped, as hereinbefore stated, and by opening the said valve L the full power of the hydrocarbon-engine H can be exerted for the purpose of operating the air-pumps G.

Figure 16:
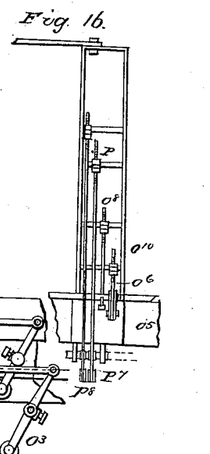
Fig. 16 is an elevation on line $ss$ of Fig. 14.
Figure 17:
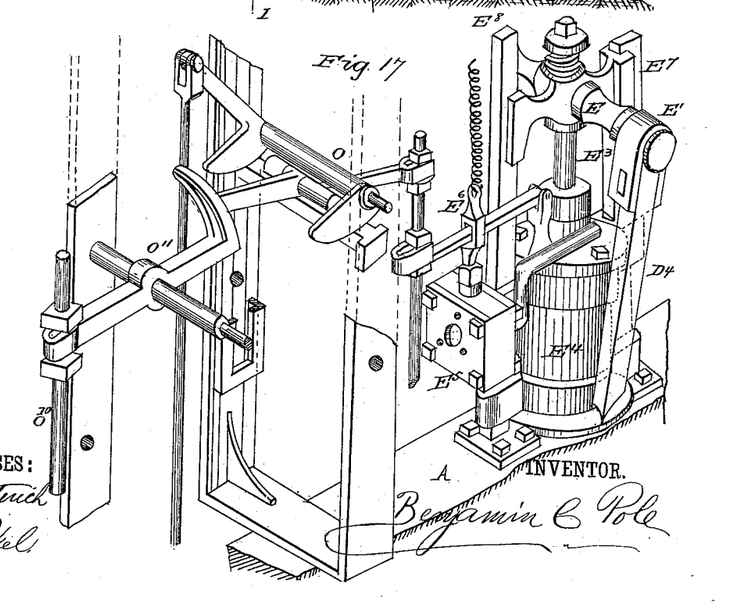
Fig. 17 is an isometrical view of the valve action and couplers belonging to the lifting-cylinder of the foot mechanism.
Figure 18:
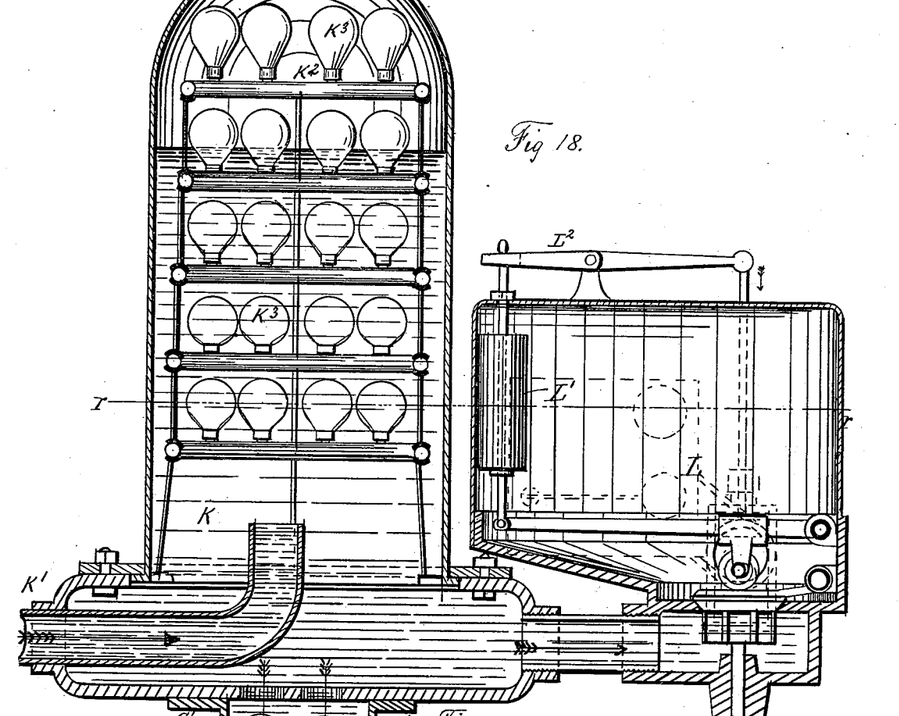
Fig. 18 is a sectional side elevation of the hydraulic reservoir and overflow safety-valve.
Figure 19:
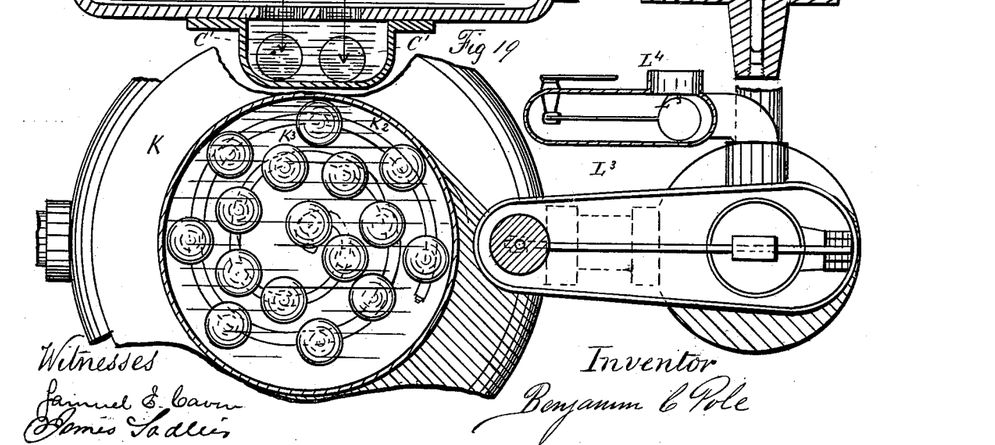
Fig. 19 is a sectional plan view of overflow-regulator, also regulator for turning off the hydrocarbon-gas supply from the gas-engine, taken on line $rr$ of Fig. 18.

In the hydraulic reservoir K are placed a number of pipes, $K^2$, of rubber or other suitable material, and rubber bags $K^3$. These pipes $K^2$ and bags $K^3$ are filled with compressed air to a pressure equal to about one-half of the intended pressure to be carried by the reservoir K. These pipes $K^2$ and bags $K^3$ are sealed, and, as before stated, are in the space within the reservoir K, as shown in Fig. 16. The water-pressure is unable to compress these bags $K^3$ until the pressure of the water is above that of the compressed air, which they contain, then a large quantity of water can be forced into the reservoir K, thereby compressing the cubic area of these bags, and this water will be expelled with a pressure in amount equal to the cubic compression of the bags, and at and above the pressure of the bags, and far greater than the ordinary pressure of the air.

From the valve L, and connecting therewith, is taken the ball-tap $L^3$ and lever $L^4$, by which means the hydrocarbon is cut off from the engine H. When the overflow of the fluid from the reservoir K opens the valve L by the pressure of the fluid, the receptacle holding the ball-tap $L^3$ will fill up, and lifting the floating ball gives the action by which the flow of gas is checked to the engine H; but when the overflow is due to the action of the engineer opening the valve L by rod $L^2$, said action is arranged so that the receptacle which holds the ball-tap to float it is also opened, preventing the floating of the ball, and therefore the ball-tap action does not take place to check the engine H. When the overflow of the fluid from the reservoir K, by virtue of the requisite pressure, which pressure is maintained without stopping the engine H, opens the valve L, the fluid fills the receptacle in which there is the ball-tap, and filling the same lifts the ball-tap, thus checking the hydrocarbon supplied to the engine H. Therefore, the engineer can relieve the water-pressure and allow the engine to work rapidly and fill up the air-pressure. The cylinders C are in a diagonal position, as shown, and are provided with four cut-off valves, $C^{17}$, two to each cylinder, these valves $C^{17}$ being placed upon the pipes C' and $C^2$, making the exhaust and pressure valves of the cylinder, and the valves $C^{17}$ of each cylinder are operated by two pneumatic cylinders, $C^{18}$, having pistons and piston-rods $C^{19}$. These pistons are forced in and out by the compressed air, and their actions control the positions of the valve $C^{17}$. Thus one pneumatic cylinder $C^{18}$ opens the exhaust at one end of cylinder C and closes the exhaust at the other end, and the second pneumatic cylinder $C^{18}$ opens the valve at one end of the cylinder C and closes it at the other end.

Figures 20, 21:
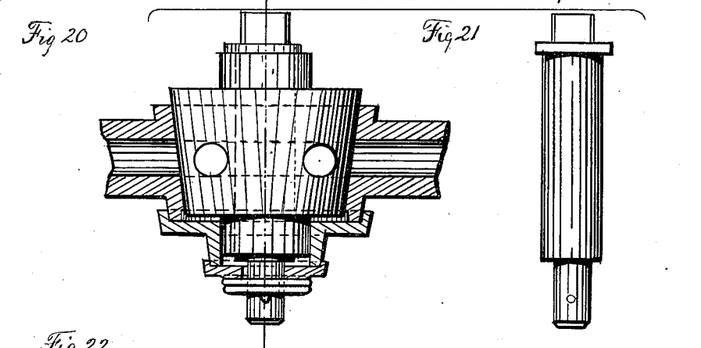
Fig. 20 is a sectional elevation of pneumatic valve.
Fig. 21 is a view of pin for pneumatic valve.

The air-valves of the cylinder $C^{18}$ are shown in Figs. 20 and 21, and these valves are brought under control and operated by the hereinafter-described coupler system of this invention.

Upon the top of the locomotive is the hydrocarbon or compressed-gas receiver H', which is supplied with the compressed gas or hydrocarbon through pipe $H^2$, and the compressed gas is passed through the pipe $H^3$ and regulator to the gas-bag $H^4$, (shown in dotted lines in Figs. 1 and 6,) and from this source the hydrocarbon-engine is supplied with fuel and power. The regulator prevents the pressure of the compressed gas being greater than is usual to supply to gas-engines, and the gas can be stopped off by the positive stop-valve $H^6$. The receptacle or receiver H' may be placed on any suitable part of the locomotive. The locomotive has a suitable covering, J, for the engine-driver, and is provided with light glass shutters or curtains J'. The bell-rope $J^2$, from the car to the locomotive, operates the bell $J^3$ in the roof of the cover J of the locomotive. The exhaust of the engine H is muffled by the box cover $H^7$, as shown in dotted lines in Fig. 1. On the two ends of the cylinders C are the air-cushion vessels $C^{20}$. In the foot mechanism D the part $D^5$, which comes in contact with the ground, is constructed with wearing-points. The water, which is pumped over and over again in this locomotive for the purposes of operating the traction-feet, is prevented from freezing by hot water and by contact with the hot cylinder of the gas-engine, around which it is constantly circulating. The foot mechanism D can be covered in with wrappings $D^{17}$, made of canvas or other suitable material, for the purpose of preventing injury to the bolts and journals from dust or any foreign matter.

The reversing, starting, and stopping lever M of the locomotive is provided with the ordinary spring-stop, M', and works upon the pin $M^2$, upon which are two uprights $M^3$ and $M^4$. These uprights $M^3$ and $M^4$ engage with rods N and N', having the slots $N^2$ and $N^3$, by which construction the lever M can be pushed forward without changing the position of the rod N'; but the action of pushing forward will carry and operate rod N. The operation of these rods N and N' brings into action couplers O and O'. The end of the rod N engages with the rod $M^5$, and this rod $M^5$ is connected to a right-angle lever, $M^6$, operating a link, $M^7$, which connects with a valve-rod, $M^8$, of the hydraulic valve-chamber $M^9$. This valve-chamber $M^9$ is upon the pressure-pipes C' of the hydraulic construction, and the plunger $M^{10}$ will open the pipe C' (two of them) either by being drawn up or forced downward in the valve-chamber $M^9$. By this means the speed of the locomotive is regulated by the capacity of the opening given to the pipe C', the valve $M^9$ regulating the flow in the pipes C', thereby allowing the lever M, when moved in either direction, to regulate the speed of the locomotive, whether going forward or backward. It is clear that to go forward the lever M is pushed forward; to stop, it is brought back to the center, and to go backward the lever is pulled over backward. The rods N and N' operate the couplers O and O', and these couplers make the the reverse actions for the locomotive; and as a slight action only is necessary to bring these couplers O and O' into full play, the springs $N^4$ and $N^5$ yield and hold the coupler action in full play while the lever M is pressing forward and increasing the speed of the locomotive, the collars $N^6$ and $N^7$ holding the rods N and N' in the position desired.

Figures 22, 23, 24, 25, 26, 27:
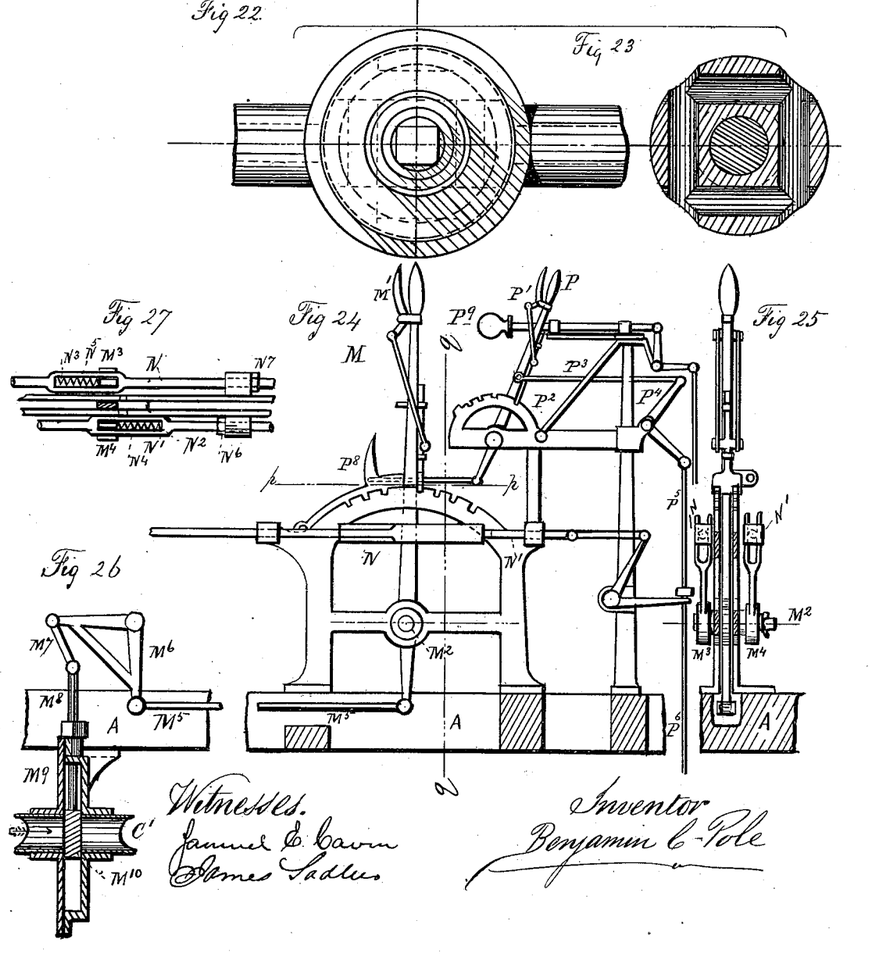

To the front of the lever M and to the left-hand thereof in front of the driver is the lever P, which is provided with the spring-action P', for holding it in position on the rack $P^2$. This lever P connects with the rod $P^3$, which again connects with the right-angle action $P^4$, which action connects in turn with rod $P^5$, which connects with another right-angle action, $P^6$. This action $P^6$ connects with a right-angle action of the coupler action $P^7$, said coupler action being for the purpose of coupling and opening the valve $E^6$ in such a manner that the cylinders $E^4$ shall force up the piston-rod $E^3$, and take and hold the foot mechanism D off the ground, permitting the locomotive to roll simply on its wheels as it would on downgrade, and be stopped by the action of brakes, although the action of the levers M will perfectly regulate the speed of the foot mechanism D, and when brought up to the center, as shown in Fig. 24, stop the locomotive by the foot-action. The check $P^8$ is lifted, and the lever M can be thrown back, causing the foot mechanism D to work in reverse direction, making a most sudden stop, thus preventing an accident. The check $P^8$ will prevent the lever M accidentally being thrown back, and the foot-action would be lifted off the ground and returned to the ground working in the contrary direction, and this back action must have the check $P^8$ and lever P operated to bring the reverse action into play. This careful check action will not be so necessary with experienced drivers. It is merely provided to prevent the locomotive from being suddenly reversed in its action by the lever M being hauled hard backward, and while the locomotive might be running forward at high speed, by which act of drawing back the lever M the foot mechanism would scrape the ground and back up very suddenly, to the injury of the foot mechanism, yet really stopping the locomotive almost instantly or in half its length. The stops and couplers $P^9$ are double and connect through to identical couplers, making the possibilities of raising either foot mechanism D from the ground both up out of ground contact or only one mechanism D up and off the ground, as it is distinctly understood that each foot mechanism D is operated by two cylinders independent of the actions of the two cylinders on the opposite side of the locomotive— one cylinder to lift and replace the foot D and one to push or pull it along when placed or lifted—and the length of the cylinder $E^4$ will allow the foot to rise and fall, and should it step down on a stone four or six inches high the actions of making a forward motion will be the same as if it went lower and touched the regular surface; also, the foot would reach down six or eight inches into a hole, or when the cobble-stone has been removed, and not interfere with the motion of the forward and backward stroke of the foot; or, more properly speaking, the foot remains planted and the locomotive moves, and one foot operating and moving the locomotive while the other is drawn up and not falling or operating the locomotive. The diagram action of the foot is shown in dotted lines in Fig. 14. The connecting-rods $D^3$ and $D^4$ come in contact with the elastically covered and swinging rollers $O^2$ which are connected upon rods $O^4$ to a lever-connection, $O^5$. This operates the rod $O^6$ and lever $O^4$. A connection, $O^8$, operates a right-angle connection, $O^9$, which again operates a rod, $O^{10}$, which is attached to a lever, $O^{11}$, which operates the coupler-lever O. The rods N and N' operate the couplers O and O', making a reverse action. The valve $E^6$, the couplers $P^7$ and $P^9$, belong to the mechanism for lifting off of the ground the foot mechanism D. The swinging rollers $O^{12}$ operate the valves of the cylinders $C^{18}$ for the regulation of the length of stroke of the piston of cylinder C. This action may be taken from the pistons' action at $O^{13}$ and $O^{14}$, as shown in Fig. 6.

The operation of this invention is such that the hydrocarbon-receiver H' is charged with hydrocarbon (compressed gas) which is passed through a regulator to lessen the pressure and regulate the flow, and is delivered at low pressure in the elastic gas-bag. (Shown in dotted lines in Fig. 1.) The gas is then conveyed to the gas-engine H, and this engine continually pumps water and air to a certain desired pressure, these pressures being regulated as has hereinbefore been described, and these accumulated fluids (air and water) are used, substantially as hereinbefore described, by the diagonal cylinders C and upright cylinders $E^4$. These cylinders—two to each system on either side of the engine—are controlled by the action of the couplers, levers, valves, and coupler combinations. The swinging rollers $O^{12}$ operate the valves of the cylinders $C^{18}$. Sometimes this action for the water-cylinders can be taken from the strokes of the piston of the cylinder C, and by the construction herein shown and described the cylinder $E^4$ and all the equivalent forms of said cylinder will invariably perform the duty of lifting and resetting the foot mechanism D upon the ground and adjust itself to the inequalities of that ground, as hereinbefore described, and the coupler-connection would allow the feet to be raised, as specified. In the matter of charging the receiver K at the depot, the hydrocarbon-engine will be dispensed with, and the valve-action will be operated by air derived by the forcing action of the pistons of cylinder C; the connections for this action being made therewith. The air is forced into the hydraulic reservoir K at a pressure, coming to the top of the water, and the water will be forced out of the cylinder at the full pressure of the air, and the piston speed and its area will be the quantity required to run a given distance, and the exhaust-water may be returned to be again forced over and over again by the air-pressure. The reservoir K need not necessarily be provided with the rubber pipes and bags, as hereinbefore described.

Having thus described my invention, what I claim as new and useful is—

1. In a locomotive or other motor, the hydrocarbon-engine H, in combination with the air and water pumps G' and I, reservoirs K and F, and cylinders C and $E^4$, for operating the foot mechanism D, substantially as and for the purpose specified.

2. In a locomotive or other motor, the diagonally-arranged hydraulic cylinder C and upright cylinder $E^4$, in combination with the foot mechanism D and the operating-power, substantially as and for the purpose specified.

3. In a locomotive or other motor, the hydraulic cylinder C, for propelling, and the double-acting pneumatic cylinder $E^4$, for raising and lowering the foot mechanism D, substantially as and for the purpose specified.

4. In a locomotive or other motor, the combination, with the cylinder $E^4$, of the couplers O O', valve $E^6$, and couplers $P^7$ and $P^9$, for lifting and holding up the foot mechanism D, substantially as and for the purpose specified.

5. In a locomotive or other motor, the combination, with the reservoirs K, of the automatic safety-valve L, provided with the weight L', ball-tap $L^3$, and lever $L^4$, substantially as and for the purpose specified.

6. In a locomotive or other motor, the lever M, in combination with rods N N', rod $M^5$, right-angle action $M^6$, and valve $M^9$, substantially as and for the purpose specified.

7. In a locomotive or other motor, the combination of the compressed-gas receiver H', pipe $H^3$, provided with the gas-regulator, and elastic gas-bag $H^4$, with the gas-engine H, substantially as and for the purpose specified.

8. In a motor, the compressed-gas receiver H', pipe $H^3$, provided with a gas-regulator to reduce high-pressure gas to city pressure to supply a gas-engine, and the elastic bags $H^4$ filled with city-pressure gas to supply a gas-engine, which is the motive power of a motor, substantially as and for the purpose set forth.

9. In a motor, a gas-engine as the motive power for the movement of the motor, said gas-engine supplied with gas through a system of regulators from a compressed-gas tank of high-pressure gas, substantially as and for the purpose set forth.

In testimony whereof I affix my signature in presence of two witnesses.

BENJAMIN C. POLE.

Witnesses:
S. A. HAMILTON,
SAMUEL E. CAVEN.